April 3, 1951 R. F. CLEAVER 2,547,622
RADIO DIRECTION FINDING SYSTEM
Filed Feb. 27, 1948 5 Sheets-Sheet 1

Inventor
Richard Francis Cleaver
By
Attorney

April 3, 1951   R. F. CLEAVER   2,547,622
RADIO DIRECTION FINDING SYSTEM
Filed Feb. 27, 1948   5 Sheets-Sheet 2

Inventor
Richard Francis Cleaver,
By
Attorney

April 3, 1951

R. F. CLEAVER 2,547,622

RADIO DIRECTION FINDING SYSTEM

Filed Feb. 27, 1948

Inventor
Richard Francis Cleaver
By
R. F. Morris
Attorney

April 3, 1951 R. F. CLEAVER 2,547,622
RADIO DIRECTION FINDING SYSTEM
Filed Feb. 27, 1948 5 Sheets-Sheet 4

Inventor
Richard Francis Cleaver
By
Attorney

Patented Apr. 3, 1951

2,547,622

UNITED STATES PATENT OFFICE 2,547,622

RADIO DIRECTION FINDING SYSTEM

Richard Francis Cleaver, London, England, assignor to International Standard Electric Corporation, New York, N. Y., a corporation of Delaware Application February 27, 1948, Serial No. 11,393
In Great Britain January 10, 1947

Section 1, Public Law 690, August 8, 1946
Patent expires January 10, 1967

7 Claims. (Cl. 343—113)

This invention relates to radio direction finding systems of the type in which a directional indication is derived from the energies received over two differently directed fixed antenna systems.

A well known example of this type of direction finding system is that usually referred to as the Adcock system in which the outputs from two diagonally opposed pairs of omnidirectional antennae are connected to respective windings of a radio goniometer. Another well known example of the same type is the crossed loop direction finder. In both these examples the directional indication obtained is subject to ambiguity, the directional indication corresponding either to the true bearing or to the reciprocal thereof. In order to avoid this ambiguity it is customary in both the said systems to add a further omnidirectional antenna, generally referred to as the sense antenna, which is located at the centre of the main antenna system. By combining output from this sense antenna with output from the search coil of the goniometer in phase coincidence the two lobe directional diagram corresponding to the main system is converted into the well known cardioid diagram, with the result that rotation of the seach coil yields only a single null (or single maximum) and the ambiguity is completely resolved.

While Adcock systems of the type referred to above have given satisfactory operations this has been obtained at the expense of efficiency as judged by the intensity of the received signal. In order to avoid the instrumental type of error commonly referred to as "octantal" or "spacing error" it is necessary to use an antenna system of small aperture, i. e. small diagonal or base line which for example should not exceed $0.14\lambda$ if the octantal error is to be limited to $\pm\frac{1}{2}°$ on ground wave reception. Since the antennae which make up a diagonally opposed pair are connected in opposite sense the output of the pair corresponds to the difference between two vectors whose phase difference is not great, and this difference-output is therefore relatively small.

It is, therefore, a principal object of the present invention to provide a radio direction finding system of the type specified using wide aperture antenna arrangements with resulting improved signal reception efficiency while retaining a low value of spacing error.

There has already been disclosed, in the specification of British Patent No. 498,147, a direction finding system in which the antenna arrangement comprises a plurality of more than two pairs of antenna units, the units being equally spaced round the circumference of a circle, two diametrically opposite units forming a pair and being coupled in opposition, i. e. constituting what is generally referred to as an Adcock pair. In an embodiment comprising three such pairs, each pair is coupled to a corresponding goniometer field coil; these three field coils may be disposed in space at 120° angular intervals, and jointly coupled to a single search coil; or each coil may be coupled to a corresponding search coil, the three search coils being rotated by a common spindle. With such an arrangement the octantal or spacing error is so reduced as to permit the antenna system to have an aperture i. e. diameter up to one half the operating wavelength. In another embodiment the antenna arrangement comprises four Adcock pairs, each pair being coupled to a corresponding field coil of a goniometer (i. e. there are four field coils in all) and the aperture of the antenna system may be as high as three quarters of the operating wavelength. All the embodiments have the common feature that the receiver has as many input circuits coupled to the antenna system as there are Adcock pairs in that system.

According to its most general aspect, the present invention provides a directive radio antenna arrangement comprising two like interlaced and independently operative arrays having a common effective radiation centre, each array having a radiation polar diagram corresponding substantially to a cosine function of $N\theta$, where N is an integer greater than unity and $\theta$ is the azimuth bearing of the direction of radiation, said arrays being angularly displaced relative to each other in such manner that each radiation lobe of one array lies substantially mid-way between two adjacent radiation lobes of the other array. Such an antenna arrangement may form part of a radio direction finding system in which a receiver means has two input circuits coupled to respective ones of said arrays, and in which indicating means responsive to said receiver means yields an indication related to the direction of propagation of radiant energy received by said arrays.

More particularly, according to one feature of the invention, there is provided an N-fold Adcock-type radio direction-finding system, where N is an integer greater than unity, said system comprising receiver means having two input circuits each coupled to a respective like independently operative array of N Adcock pairs of antennae, said pairs comprised in an array being operative in parallel, and indicating means responsive to said receiving means and yielding an indication related to the direction of propagation of radiant energy received by said arrays, each said array being characterised in that the antennae of the said Adcock pairs are located at respective pairs of adjacent corners of a 2 N-sided regular polygon, no two adjacent antennae of the array having the same polarity of coupling, the polygon being so dimensioned that the radiation polar diagram of the array is substantially a cosine function of $N\theta$ where $\theta$ is the azimuth bearing of the radiation, the polygons corresponding to the two arrays having the same centre but being angularly displaced relative to each other by $90°/N$.

According to another feature of the invention, there is provided a radio direction finding system comprising $4N$ like omnidirectional antennae equally spaced round the circumference of a circle, N being an integer greater than unity, alternate ones of said antennae constituting a first independently operative array, the remaining antennae constituting a second independently operative array, receiver means having two input circuits each coupled to a respective said array, indicating means responsive to said receiver means and yielding an indication related to the direction of propagation of radiant energy received by said arrays, each said array being characterised in that alternate ones of the antennae comprised in the array are coupled to the associated said input circuit in opposite sense to the remaining antennae of that array, and the circle diameter being such that the radiation polar diagram is substantially a cosine function of $N\theta$ where $\theta$ is the azimuth bearing of the radiation.

Preferably, the linear spacing between two adjacent antennae of a said array is of the order of one half the operative wavelength.

A single direction-finding system of the N-fold Adcock type as outlined above yields a directional indication of low instrument error but subject to 2N ambiguities. By the addition of a sense antenna arrangement the number of ambiguities is reduced from 2N to N. If it is essential to resolve the ambiguities completely, this may be done by providing two systems having values of N differing by unity, each system having a sense antenna; while the indication furnished by each system may be interpreted as corresponding to its own plurality of bearings, only one bearing will be common to both pluralities. Alternatively, a conventional direction-finding system of relatively low accuracy but given unambiguous indication may be used to solve the ambiguity of the more accurate system.

The invention will be understood more clearly from the following description of several embodiments as illustrated by the accompanying drawings, in which.

Figure 1:
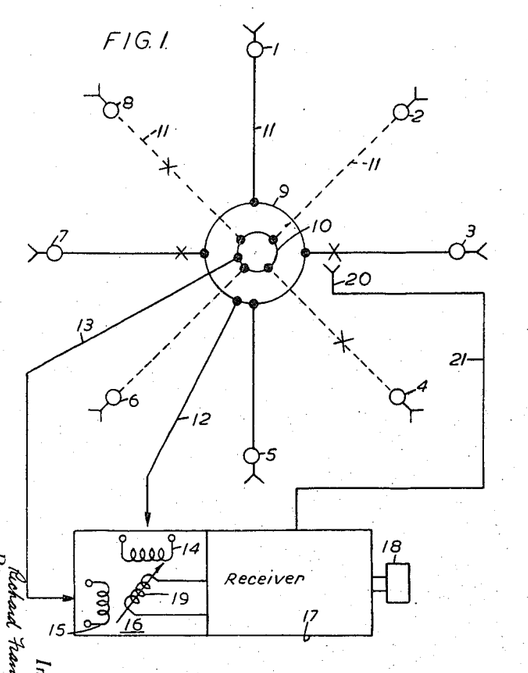
Fig. 1 illustrates a direction-finding system according to the invention using a two-fold Adcock antenna system.

Referring now to Fig. 1, which illustrates an embodiment of the invention incorporating a 2-fold Adcock antenna system ($N=2$), the complete antenna system comprises eight, i. e. 4N omnidirectional antennae 1, 2 . . . . . 8 equally spaced round the circumference of a circle. Alternate antennae 1, 3, 5 and 7 constitute a first independently operative array the output of which is delivered at terminals represented by ring 9, while the remaining antennae 2, 4, 6 and 8 constitute a second independently operative array the output of which is delivered at terminals represented by ring 10. The linear spacing between any two adjacent antennae of an array, such as between 1 and 3 or between 2 and 4 is of the order of one half the operating wavelength. Each antenna is coupled to the corresponding array terminals over a transmission line illustrated by reference 11, the electrical characteristics of the path between the antenna and the terminals being made the same for all antennae, either by using equal physical lengths of transmission line, or by equalising the lines by sections of artificial line. Each antenna may if necessary be coupled to its transmission line by an amplifier, in which case care must be taken that the amplifiers are all alike in respect of their gain and phase characteristics. While in the drawing the terminals represented by 9 and 10 are shown as located at the centre of the antenna system, it will be appreciated that such showing is purely for the sake of simplifying the drawing, and that in practice the terminals may be located at any convenient point.

In each array alternate antennae are coupled to the output terminals with polarity the reverse in sense of that of the remaining antennae of the array. Thus, in the array comprising antennae 1, 3, 5 and 7, the units 1 and 5 are coupled to the terminals 9 in one sense, while the units 3 and 7 are coupled in the reverse sense as indicated by the transpositions illustrated by the crosses in the transmission lines over which antenna units 3 and 7 are coupled to terminal 9. These transpositions may be made at any convenient point; in practice it is usually found advantageous to make them either at the input (antenna) end of the line, or at the output (terminal) end of the line. Similarly, in the array comprising antennae 2, 4, 6 and 8, the units 2 and 6 are coupled to terminals 10 in one sense of polarity, while units 4 and 8 are coupled with reverse sense of polarity.

The output terminals 9 and 10 of the two arrays are coupled over connections 12 and 13 to the two input circuits 14, 15 of a receiver system comprising a goniometer 16, a receiver 17, and indicating means 18 responsive to energy transferred to receiver 17 through the goniometer, the search element 19 of which is rotated into the position giving a null indication, the angular relationship between the goniometer search element and the field elements being then related to the direction of propagation of the energy received by the arrays. As explained hereinafter, the relationship between the goniometer setting and the direction of propagation contains ambiguities, i. e. a particular setting corresponds to more than one direction of propagation. With the antenna arrays shown in Fig. 1, each angular setting of the goniometer corresponds to one of four directions uniformly spaced round the azimuth circle. A sense antenna 20 is therefore included in the antenna system and located at the radiation centre of the two arrays; this sense antenna is so coupled to receiver 17, over connection 21, that its output is combined with that of search element 19 in co-phasal relationship, and has the effect of removing one half of the ambiguities.

In Fig. 1 the goniometer is shown as comprising inductive fixed (field) and search elements. It will be understood that goniometers comprising capacitance elements may equally well be used. Preferably, connection 21, together with any coupling apparatus in series therewith, should have the same electrical characteristics as the path from say antenna 1 to the receiver over connections 11 and 12; the sense antenna output will then be delivered to receiver 11 in the desired co-phasal relationship with the output from the goniometer; this applies to all embodiments of the invention in which the number of elements in each array is equal to 2N, and N is an even number.

Figure 2:
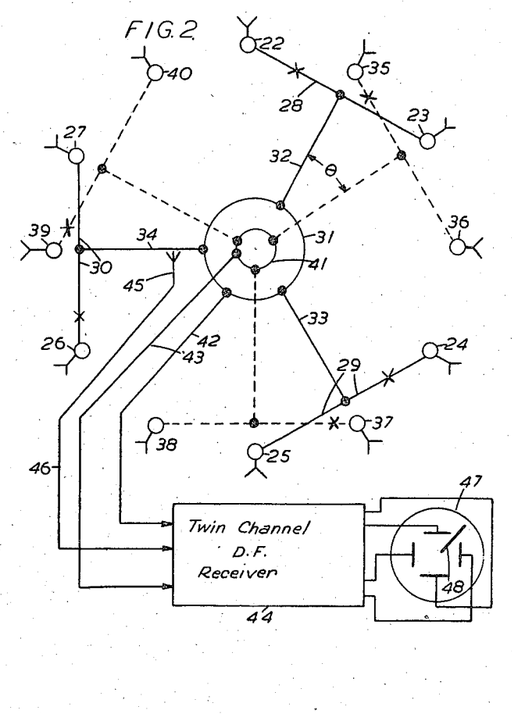
Fig. 2 illustrates another embodiment of the invention using a 3-fold Adcock antenna system.

Turning now to Fig. 2, which illustrates an embodiment of the invention incorporating a three-fold Adcock antenna system ($N=3$), the complete antenna system comprises 12, i. e. 4N, antennae arranged in two like arrays, each array comprising three Adcock pairs, i. e. three pairs of like omnidirectional and differentially coupled antennae. One of the arrays comprises the antenna pairs 22—23, 24—25, and 26—27, each pair of antennae being located at a respective pair of adjacent corners of a 6-sided (i. e. 2 N-sided) regular polygon, the length of a side of which is of the order of one half the operating wavelength. Transmission line couplings between the antennae of each pair are indicated by the full lines 28, 29 and 30, each line having a transposition, indicated by a X, these transpositions being so located that no two adjacent antennae of an array have the same polarity of coupling. The midpoints of the coupling lines 28, 29, 30 are connected to the array output terminals indicated by ring 31, by means of transmission lines 32, 33 and 34, the electrical characteristics of the path from any antenna of the array to the array output terminals being equalised, as described in connection with Fig. 1. The other array comprises the remaining antenna pairs 35—36, 37—38 and 39—40, connected over a transmission line system, indicated on the drawing by dash-lines, to the array output terminal 41, the antenna arrangement and the transmission line system being similar to that described in connection with the first array. The polygons corresponding to the two arrays have the same centre, but are angularly displaced relative each other by 30°, i. e. by 180°/N, as illustrated in Fig. 2 by the angle $\varphi$.

Still referring to Fig. 2, the output terminals 31 and 41 of the two arrays are coupled over like transmission line paths 42 and 43 to respective channel input circuits of a twin channel type of direction finder receiver indicated generally by block 44. Input is also applied to this receiver from a centrally located sense antenna 45 over transmission line path 46, for the purpose of removing ambiguities of the reciprocal type. As in the case of Fig. 1, it is necessary that the input from the sense antenna be combined with the input from the two arrays in co-phasal relationship, and the electrical characteristics of the transmission path 46 should therefore be the same as those of transmission paths 42 and 43, and should in addition provide a 90° phase shift, since the voltage delivered by each array is, as hereinafter explained, in quadrature with the voltage at the sense antenna terminals when the number of antennae elements in each array is equal to 2N and N is an odd number. (When N is an even number, as in the case of the embodiment illustrated in Fig. 1, the array voltage is in phase with the sense antenna voltage, and there is no need to provide a 90° phase shift to obtain cophaseability at the receiver.) The output of twin channel receiver 44 is applied to the quadrature deflecting plates of a cathode ray oscillograph 47 on which the directional indication determined by the ratio of the channel outputs, displayed as a unidirectional radial trace 48 the angular co-ordinate of which is related to the direction of propagation of the received signal, corresponding in fact to any one of three directions uniformly spaced around the azimuth circle, one of the three directions being the true direction of propagation. Means for solving this ambiguity are disclosed hereinafter.

Figure 3:
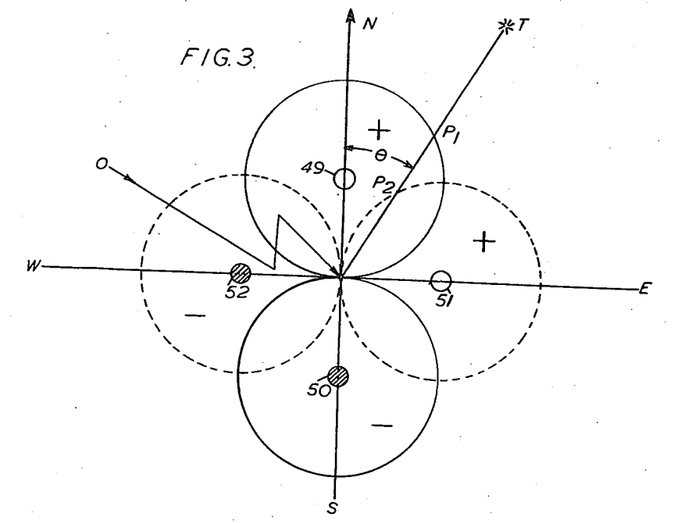
Fig. 3 illustrates the polar diagram of a conventional Adcock antenna arrangement.

The twin channel receiver 44 operating into the cathode ray indicator 47 constitutes an automatic cathode ray direction finder receiver arrangement such as is described in the specification of British Patent No. 490,940, or in "Wireless Direction Finding," by R. Keen, fourth edition, pp. 844–846, the only difference being in the directive antenna arrangements actuating the receiver. It is to be understood however that any suitable receiver and indication arrangement may be used in conjunction with the antenna systems such as are illustrated in Figs. 1 and 3, the only requirement being that the receiver is adapted for energisation by two angularly displaced directive antenna systems, and that provision is made for adding input from a sense antenna to remove ambiguities. If convenient as for example when bearings are to be taken over such a limited arc of azimuth that no question of ambiguity arises, the sense antenna and associated circuits may be omitted.

Figure 4:
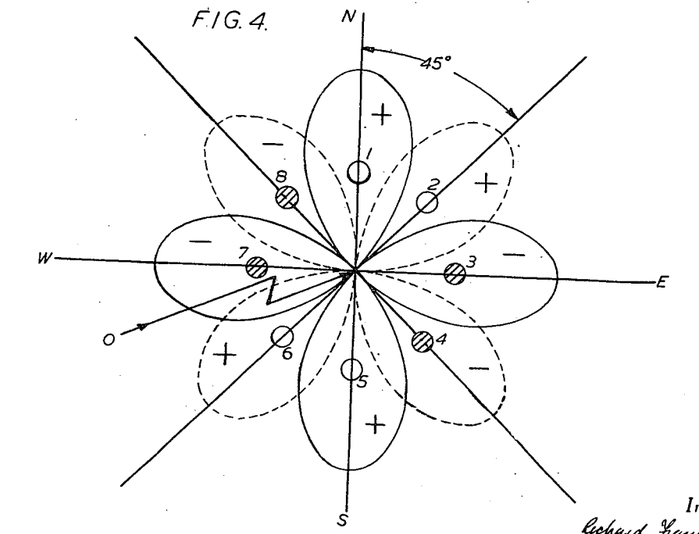
Fig. 4 illustrates the polar diagram of a 2-fold Adcock antenna arrangement forming part of the embodiment shown in Fig. 1.
Figure 5:
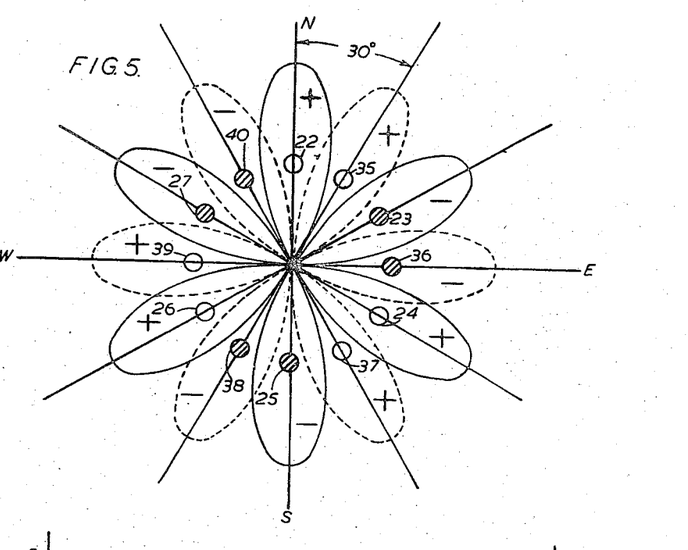
Fig. 5 illustrates the polar diagram of a 3-fold Adcock antenna arrangement forming part of the embodiment shown in Fig. 2.

For an explanation of the theory of the system reference may now be made to Figs. 3, 4, and 5 which illustrate the respective reception diagrams of a conventional Adcock direction finding system using two crossed Adcock antenna pairs, of a 2-fold Adcock antenna system according to the invention and shown in Fig. 1, and of a 3-fold Adcock antenna system according to the invention and shown in Fig. 2, the same antenna reference numbers used in Fig. 3 as in Fig. 1 and in Fig. 4, as in Fig. 2.

To illustrate the principle of the proposed system we consider first the case of a 4 antenna automatic Adcock direction finding system with cathode ray oscillograph indication. Bearings are indicated on a scale of 360 degrees, the indication changing degree for degree with the azimuth of the transmitter, except for variations due to error. Instrumental errors may be considered to be of the order of 0.25–0.5% of the full angular scale length of the indicator which is 360 degrees. By means of the present invention such errors are divided by a factor N which may be chosen at will by increasing the angular scale length so that 360 degrees of azimuth are expanded to 360 N degrees of indicator scale. (It is self evident that increasing the linear scale length by enlarging the compass scale merely increases the reading accuracy.) The expansion of the angular scale length by an integral factor N necessarily introduces an N-fold ambiguity which may be resolved by providing for the display (or measurement in a goniometer equipment) of a non-ambiguous and approximate "coarse" bearing indication.

Fig. 3 shows the symmetrically staggered figure of eight polar diagrams of the two component elements of a conventional 4-antenna Adcock system. The small circles represent the antenna system in plan, the component parts being diagonally opposite pairs 49—50 and 51, 52. The antennas 49 and 50 are connected in opposition and provided with a pair of output terminals (not shown) the arrangement of antennas 51 and 52 being similar. The antennas in reversed connection are indicated conventionally by filling in the corresponding small circles.

The positive and negative signs distinguish lobes of the polar diagrams in respect of phase; all lobes marked with one sign represent some arbitrary phase, while those marked with the other indicate the opposite phase. This convention is followed in all the subsequent diagrams. The polar diagrams of the two component parts are distinguished in this and subsequent diagrams by full and dashed lines, the latter corresponding with the even-numbered series of antennas. The line SON represents the meridian drawn from south to north through O, the centre of the system, whose orientation is such that the antennas 49 and 50 lie in the meridian plane, with 49 occupying the northerly position. The bearing of a transmitter T is then represented by the angle NOT. If the line OT cuts the polar diagrams of the 49, 50 and 51, 52 antenna pairs at $P_1$ and $P_2$, then the voltage outputs from the corresponding terminals of the antenna system will be proportional to $OP_1$ and $OP_2$, and according to well-known theory, the bearing $\theta$ can be determined by an appropriate method of measuring the ratio $OP_2/OP_1$, which is connected with $\theta$ by the relation $$\tan \theta \approx OP_2/OP_1$$

There is an element of approximation in this formula, which gives rise to octantal error. This need not be considered here except to state that it is due to the fact that the cosine law is not followed precisely. That is to say, the figures-of-eight are not accurate cosine plots in polar coordinates.

Consideration of Fig. 3 shows that to obtain the desired N-fold increase in angular scale length, symmetrically staggered polar diagrams having N times as many lobes are required. Such diagrams are illustrated in Figs. 4 and 5 for the cases of $N=2$ and $N=3$ respectively. As before the polar diagrams of the two elements of the system are distinguished by full and dashed lines. Clearly the required improvement in accuracy can only be obtained if the lobes follow the cosine law to at least as close an approximation as those of the basic 4-antenna system. Fortunately it has been found that this condition is easily satisfied.

Figs. 4 and 5 also indicate forms of array which give the required polar diagram, subject to some easily attainable conditions as to the size of the system in relation to a wavelength. Referring to Fig. 4 it will be seen that for eight lobes, eight antennas evenly spaced around a circle are employed, in symmetrical relation to the lobes. In this, as in other respects, the arrangement is analogous to that of Fig. 3. Counting clockwise from the meridian ON, the odd numbered antennas are connected together in alternate direct and reversed sense. The antennas even numbered are similarly inter-connected. The two sets of interspersed antennas have two pairs of output terminals and may be connected to indicating apparatus of the goniometer or oscillographic type, just as in the case of the conventional system of Fig. 3.

It has already been stated in connection with the embodiments illustrated in Figs. 1 and 2 that a central antenna for the partial resolution of ambiguities is desirable; it is to be understood however, that such a central antenna is not essential for any purpose other than the resolution of ambiguities and does not per se add for the improvement in accuracy by reduction of spacing error or errors of a similar nature.

The action of such an antenna in the conventional case is well known and will not be considered here. Its effect is to select the true bearing from two reciprocal indications, or in other words to reduce the number of possible bearings from two to one. In the generalised case it has the effect of reducing a 2N-fold ambiguity by half, leaving N possible answers to the problem. The final resolution, in this latter case, can be achieved in a variety of ways; by a completely separate conventional direction finder, or more economically by the use of a concentric conventional antenna system employing a common central antenna and common receiving and display equipment. Alternatively it may be that the required bearing is already known approximately so that there is no real ambiguity.

The general characteristics of an N fold Adcock system according to the invention may be listed as follows:

(a) The complete antenna arrangement always comprises an even number of antennas, divisible by 4 and combined in two equal, interspersed arrays each having its own output terminals. The antennas of an array are connected alternately in direct and reversed sense.

(b) The polar diagram of each component array has as many lobes as there are antennas, of alternately opposite phase corresponding with the alternate direct and reversed sense of connection.

(c) Directions of maximum reception are in general the directions drawn from the centre to the individual antennas, except under easily avoided conditions noted at (g) below, which correspond to extreme departures from the cosine law.

(d) The directions of zero reception for one array are coincident with the directions of maximum reception for the other and the conditions for zero reception are independent of frequency because each array may be divided into pairs of anti-phased antennas for signals arriving in the null directions.

(e) Between the directions of maximum and minimum reception, the signal output can be caused by proper choice of dimensions of the system to vary in proportion to $\cos N\theta$ in the case of one array, and to $$\cos N\left(\theta - \frac{\lambda}{2N}\right)$$

in the case of the other array.

(f) For odd values of the integer N, diametrically opposite antennas are in opposed connection, while for even values they have the same sense of connection. A consequence of this is that odd values of N given resultant voltages, from the two pairs of output terminals, which are in quadrature with the output which would be given by a single central antenna. This assumed phase compensation for the effect of the transmission lines necessarily used in the combination of signals from the circular array. When N is even, however, the resultant outputs are in phase with that from a central antenna under the same conditions. This may be an important factor influencing the choice of N.

(g) As the diameter of the aperture or pitch circle of the antennas is increased from a very small value, in terms of a wavelength, the signal output increases and the characteristic features (b) (c) and (e) above are substantially maintained until the diameter reaches a value which depends on the wavelength and increases with N. Ultimately, with fixed values of wavelength and N, the cosine law fails and the lobes of the polar diagram go through cycles of distortion and splitting, and for such diameters the array is unworkable.

Figure 6:
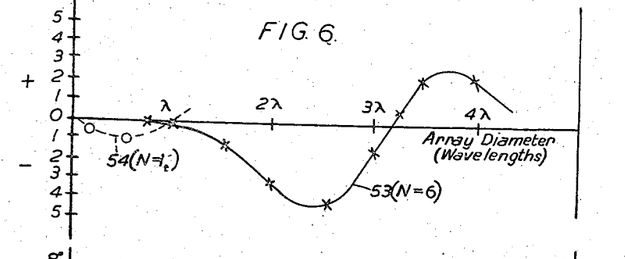
Fig. 6 illustrates the relation between pick-up and the antenna aperture for a conventional Adcock system and for a 6-fold Adcock antenna arrangement in accordance with the invention.
Figure 7:
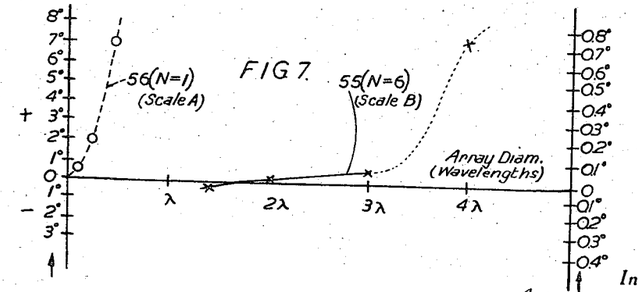
Fig. 7 illustrates the relation between spacing error and antenna aperture for the same antenna systems as Fig. 6.

Reference may now be made to Figs. 6 and 7. In Fig. 6 the full line curve 53 shows the variation of the induced E. M. F., in a 6-fold Adcock system in accordance with the invention, plotted against the antenna aperture in wave lengths. For convenience on the same figure is shown by a dashed line curve 54 the variation in the E. M. F. induced in a conventional Adcock system of the prior art using antenna units of the same height (i. e. receptive capacity) as the units of the 6-fold system under consideration. It will be observed that so far as pick up is concerned the 6-fold system is superior to the conventional Adcock system in the ratio of 4 to 1, but in order to obtain this superiority it is necessary that the aperture of the 6 fold system be made of the order of 2.5λ, whereas the conventional Adcock system attains its maximum pick up with an aperture of λ/2. The marked superiority of the 6 fold system from the standpoint of decreased spacing error is illustrated by Fig. 7, in which the spacing error for a 6 fold system is shown by curve 55, plotted against the array aperture in wavelengths, to the scale marked on the right hand side of the figure. It will be noticed that for an aperture of 2.5λ i. e. the aperture for optimum pick up, the spacing error is less than 0.1°. The spacing error for a conventional Adcock system however, is very much greater and at the optimum pick up aperture of λ/2 it amounts to 7°, as shown by curve 56, which is read against the left hand scale of the figure. In order to reduce the spacing error to a value comparable with that of the 6-fold system the aperture of the conventional Adcock system would have to be reduced to a very small fraction of a wavelength, with a correspondingly large reduction in receptive capacity below a value which at its maximum is only one quarter that of the 6 fold system.

It can be shown mathematically that to obtain efficient operation, meaning thereby good pick-up efficiency combined with low spacing error, using a large number of antenna units arranged according to the present invention, it is necessary to make the aperture of the antenna arrangement relatively large in comparison with that of a conventional Adcock system. The use of a very small diameter would actually lead to reduced reception efficiency as compared with a system using a smaller number of antenna units. This is physically obvious, since if the antennae of an array be too close together in the terms of operating wavelength, their alternate direct and reversal polarity of coupling tends to cause cancellation of the receiver signal for all azimuths of arrival. Calculations for values of N up to 10 show that the spacing between adjacent antenna of an array should be of the order of λ/2 for efficient operation. This condition is however not critical, and it has been found that a 6 fold system having the characteristics shown in Figs. 6 and 7 will operate satisfactorily over a wave band having a ratio of 2 to 1.

Figure 8:
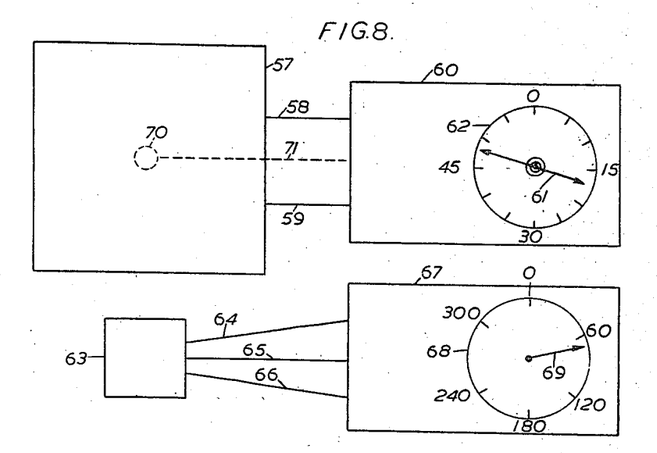
Fig. 8 illustrates a combination of two direction finding systems, of which one is in accordance with the invention, for the purpose of resolving ambiguity of indication.

Turning now to Figure 8, this illustrates an embodiment of the present invention in combination with a conventional direction finder system. In the figure the block 57 represents an N fold Adcock antenna system comprising two interlaced arrays the antennae being arranged and interconnected as hereinbefore specified. The two arrays are connected over respective transmission lines 58 and 59 to the two input goniometer circuits of a direction finder receiver 60, and the goniometer is adjusted for zero receiver input in the normal manner. The angular setting of the goniometer is then read by means of pointer 61 against circular scale 62 which is graduated over the whole length of its circumference, the total scale length corresponding to 360°/N when N is the order of the array. As an example it will be assumed that N=6 and that the goniometer setting for zero reception is at 18° on the scale, since the antenna arrangement 57 does not include any "sense" antenna, the goniometer will exhibit the usual 180° ambiguity, and the zero setting may therefore also be read as 48° on the scale, as shown on the drawing. The interpretation of these goniometer readings is that the direction of propagation of the received signals 18°+M60°, or 48°+M60°, where M have to be integer in the series 0, 1, 2, .. (N−2), (N−1).

In order to resolve these ambiguities, a second and independent direction finder system is installed in close proximity to the first. This second system is illustrated in the lower part of Fig. 8, in which the block 63 represents a direction finding antenna system of conventional type, including two crossed Adcock pairs of antennae (or two crossed loop antenna) and a sense antenna, the outputs from which are applied over connections 64, 65, 66 to a conventional direction finder receiver 67 which may be generally similar to receiver 60 except that the goniometer scale 68 is calibrated to read up to 360° over the whole arc, and that by virtue of the sense antenna input there is only one position of the goniometer angular adjustment giving zero reception for a particular direction of propagation—i. e. the direction finder indication is devoid of ambiguity. The instrumental accuracy of this unambiguous indication need not be high; all that is required of the second system is that it will indicate to which sector of the azimuth the highly accurate but ambiguous indication of the first system is to be taken.

Referring to the drawing it will be seen that the goniometer pointer 69 is set at approximately 70° on scale 68; the true direction of propagation is therefore that one of the various interpretations of the setting of the goniometer of receiver 60 which lies nearest to 70°; this one interpretation is 18°+60°=78°.

Figure 9A:
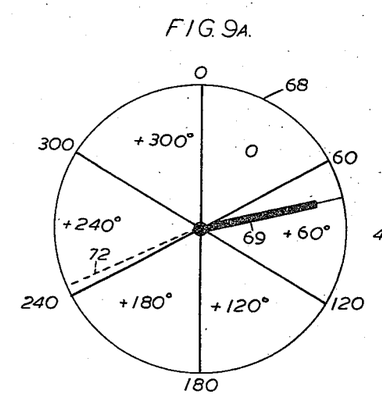
Figs. 9A and 9B show in greater detail the indicators used in the arrangement of Fig. 8.
Figure 9B:
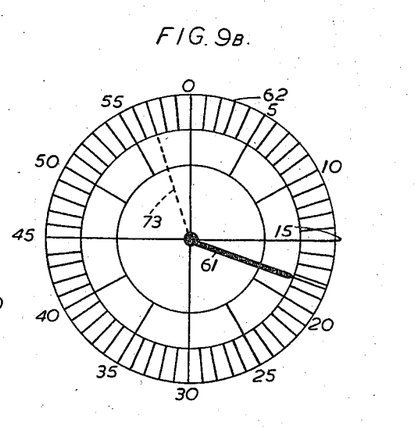

While the arrangements as just described are sufficient to resolve completely the ambiguity of the indication, some advantage can be obtained by adding a sense antenna 70 to the 6 fold Adcock antenna system indicated generally by block 57 and applying the output of this sense antenna over connection 71 to receiver 60 to remove the reciprocal ambiguity; in such case the goniometer settings would be as shown in Figs. 9A and 9B for receivers 67 and 60 respectively. In these two figures the full lines 61 and 69 correspond to the pointers indicated in Fig. 8 by the same reference numbers, the only difference being that 61 reads only on the single indication 18° and not on both 18° and its "reciprocal" 48°, and the number of ambiguities resolved is only half of that encountered when sense antenna 70 is omitted. It will be observed that for convenience the scale of the goniometer shown in Fig. 9A, i. e. the goniometer comprised in receiver 67, is marked off in sectors of 60°, and the bearing on direction of propagation is obtained by simply adding together the actual setting of the goniometer of receiver 60, shown in Fig. 9B, as 18.25°, and the value of the sector in which lies the reading of the goniometer of receiver 67, i. e. 60° as shown in Fig. 9A, without reading the actual angular indication of pointer 69. If the instrumental error of the second or resolving direction finder system, occasion may arise when the indicator settings appear as shown by the dotted lines 72 and 73 in Figs. 9A and 9B; in such case the reading on the goniometer of the N fold system is definitive, exactly as in the case of integrating gas or electricity meters, and in the example shown the final directional indication is 57°+180°=237°.

To permit this interpretation it is of course necessary that the error of the second direction finding system be appreciably less than 180°/N; this condition, however, is not difficult to satisfy.

In the foregoing description of the arrangement illustrated in Fig. 8 it has been stated that the second and independent direction finder system, i. e. the one giving an unambiguous indication is located in close proximity to the first. This must be understood to mean that the antenna arrangements denoted by blocks 57 and 63 are sufficiently close to ensure that the true bearings of any point within the service range is substantially the same for both antenna arrangements. If desired, however, the two antenna arrangements may be so located as to have the same radiation centre, the arrangement denoted by block 63 being then located with the circle of antenna constituting the two arrays comprised in block 57, the same antenna being at the centre of the circle. When such an arrangement is adapted the crossed direction antenna systems comprised in block 63 may utilise selected ones of the antenna comprised in block 57, the coupling circuits between the antennae thus selected and the receiver 67 including separating or buffer amplifiers in accordance with well known technique so as to prevent reaction between the first and second direction finding systems through the common antenna units. It will be evident that this use of common antenna units is advantageous only for small values of N, since with large values the aperture of the N fold system becomes too great for the second direction finding system to yield a single unambiguous indication.

An alternative method of resolving the ambiguities is to use two direction finding systems each according to the invention and having substantially the same radiation centre, one of the systems comprising a sense antenna and an N fold Adcock antenna system as described earlier in this specification, while the second system differs from the first in that it has a value for N differing by unity from that characterising the first system. For example, one system may comprise the antenna arrangement described with reference to Fig. 1, in which N=2, the second system comprises that described with reference to Fig. 2, in which N=3. Since each system has a sense antenna, the reciprocal ambiguity in each system is eliminated, and of the remaining possible bearings only one will be common to both systems, this being the true bearing. Preferably, but not necessarily the two sets of interlaced arrays are concentrically arranged, with a single sense antenna the output of which is fed to both the receiver systems through separator stages, and each of the coupling paths including the phasing devices necessary for to ensure that the sense antenna output is added to the array output in cophasal relationship.

Figure 10:
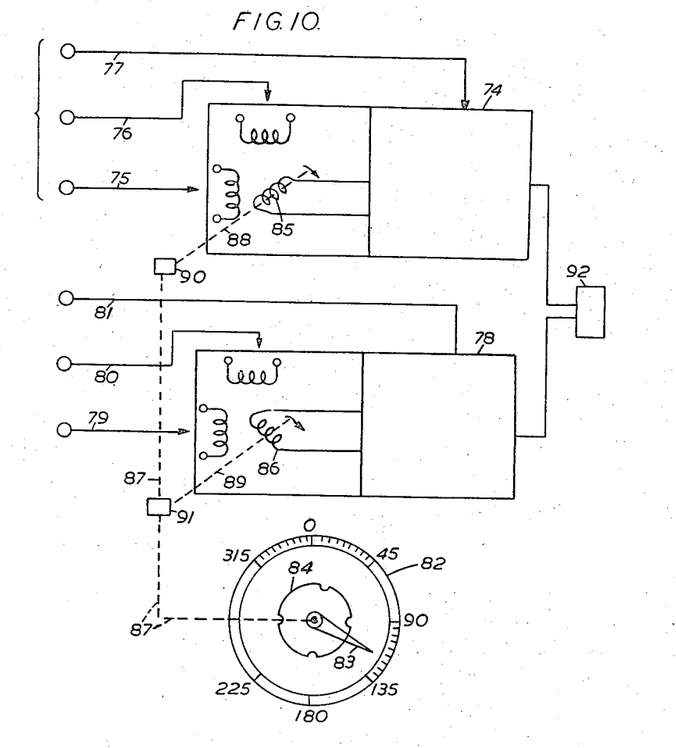
Fig. 10 illustrates a combination of two direction-finding systems, both in accordance with the invention, adapted to resolve ambiguity of indication.

In an arrangement such as the described in the preceding paragraph the selection of the true bearing may be simplified provided that both receivers are of a type comprising mechanically rotatable means, as for example, the rotatable search element of a goniometer, by the setting of which for a particular receiver conditions, such as minimum output, a directional indication is obtained, referring to Fig. 10, a first direction-finding receiver 74 of conventional type with goniometer input circuits as indicated is coupled over connections 75 and 76 to the two interlaced arrays of an N fold Adcock antenna system, and over connection 77 to a sense antenna associated with these arrays. A similar receiver 78 is coupled over connections 79 and 80 to the two interlaced array of an (N+1)-fold Adcock antenna system having associated therewith a sense antenna which is coupled to receiver 78 over connection 81. Common to receivers 74 and 78 is a single circular scale 82 calibrated in degrees over its full length up to 360°, this scale being traversed by pointer 83 when the later is manually rotated by means of knob 84. The goniometer search elements 85 and 86 of receivers 74 and 78 are also rotated by means of knob 84 through the medium of a shaft and gearing mechanism, in which a shaft mechanically coupled to knob 84 and symbolised on the drawing by dashed line 87 drives the search elements spindles 88 and 89 through gears symbolised by 90 and 91 respectively, the gear ratios being so chosen that one complete revolution of knob 84 (i. e. a pointer movement of 360°) results in N complete revolutions of search element 85 (energised from the N fold antenna arrangement) in (N+1) complete revolutions of search element 86 (energised from the (N+1) fold antenna arrangement). The outputs of the two receivers 74 and 78 are delivered in common to a single output-responsive device 92, such as head receivers. In operation, knob 84 is adjusted until the combined output of the receivers is zero; this will occur at only one point on the 360° scale, this one point being indicative of the true bearing of the received signal.

While in the system described in connection with Fig. 10 the separate direction finders have been described as having substantially the same radiation centre, it is frequently convenient to make the radiation centres coincide, in which case a single sense antenna may be used to supply sensing energy for the two direction finders the conventional buffer on separator circuits. Alternatively two sensing antennas may be retained, one mounted vertically above the other.

Although the invention has been described prematurely as a means for reducing instrument errors of the "spacing error" type until retaining a high value of receptive efficiency it also provides a system in which error due to reflections is reduced. In any direction finder system according to the present invention the maximum error which can be caused by a relatively small component of signal reaching the system by an indirect path is reduced by a factor which increases with N, the characteristic of the antenna arrangement. As increase in the number of antenna elements in the system therefore leads to a reduction in the average "site error" over 360° of azimuth, provided only that unwanted signal components received by a reflection are not so large as to prevent correct resolution of the N fold ambiguity of the system.

It should also be noted that directive antenna arrangements in accordance with the present invention have the further advantage that, by suitable choice of the characteristic N and of the aperture of the antenna system, they can be arranged to have maximum reception efficiency either in the horizontal plane, or for signals arriving along paths with some specified inclination to the horizontals, and to have much reduced sensitivity in other directions. For long distance direction finding on high frequency signals it would be advantageous to design for maximum reception efficiency for waves returned to the earth from the ionosphere; at the same time the effect of local site errors would be diminished owing to the reduced reception efficiency for unwanted reflected signals arriving along substantially horizontal paths. For very high frequency direction finding, and for medium frequency direction finding on ground wave signals, the antenna arrays would be designed for maximum reception efficiency in the horizontal plane.

It will also be understood that antenna systems of the N fold Adcock as hereinbefore described may be used to transmit signals carrying directional information, as for example in a radio beacon.

What is claimed is:

1. A radio direction finding system comprising 4N like omnidirectional antennae equally spaced round the circumference of a circle with a spacing less than one wavelength at the operating frequency, N being an integer greater than unity, alternate ones of said antennae constituting a first independently operative array the remaining antennae constituting a second independently operative array, receiver means having two input circuits each coupled to a respective said array, indicating means responsive to said receiver means and yielding an indication related to the direction of propagation of radiant energy received by said arrays, means for coupling alternate ones of the antennae comprised in each array to a respective input circuit in opposite phase sense to the remaining antennae of that array, and the circle diameter being such that the radiation polar diagram is substantially a cosine function of $N\theta$, where $\theta$ is the azimuth bearing of the radiation.

2. A radio direction finding system according to claim 1, in which said indication means comprises a cathode ray oscillograph tube having two beam deflecting means adapted to deflect the beam of said tube in respective mutually perpendicular directions, and means coupling the respective input circuits to respective ones of said beam deflecting means to produce on the screen of said oscillograph a trace the angular co-ordinate of which is determined by said ratio.

3. A radio direction finding system according to claim 1, further comprising an omnidirectional sense antenna located at the radiation centre of said arrays, and means for combining output from said sense antenna with the outputs from said arrays in co-phasal relationship in such manner as to remove reciprocal ambiguities from the yielded indication.

4. A directive radio antenna arrangement comprising two like interlaced and independently operative arrays having a common effective radiation centre, each array comprising spaced radiation elements, spaced apart at least one wavelength at the operating frequency, means for coupling alternating elements of each array together in phase opposition to provide a radiation polar diagram corresponding substantially to a cosine function of $N\theta$ where N is an integer greater than unity and $\theta$ is the azimuth bearing of the direction of radiation, said arrays being angularly displaced relative to each other to position radiation elements of each array substantially midway between adjacent elements of the other array whereby each radiation lobe of one array lies substantially midway between two adjacent radiation lobes of the other array, receiver means having two input circuits coupled to respective ones of said arrays, and indicating means responsive to said receiver means and yielding an indication related to the direction of propagation of radiant energy received by said arrays.

5. A directive radio antenna arrangement comprising two like interlaced and independently operative arrays having a common effective radiation centre, each array comprising spaced radiation elements, means coupling the elements of each array together to provide a radiation polar diagram corresponding substantially to a cosine function of $N\theta$ where N is an integer greater than unity and $\theta$ is the azimuth bearing of the direction of radiation, said arrays being angularly displaced relative to each other in such manner that each radiation lobe of one array lies substantially midway between two adjacent radiation lobes of the other array, receiver means having two input circuits coupled to respective ones of said arrays, and indicating means responsive to said receiver means and yielding an indication related to the direction of propagation of radiant energy received by said arrays, an omnidirectional sense antenna located at the radiation centre of said arrays, and means for combining output from said sense antenna with the outputs from said arrays in co-phasal relationship in such manner as to remove reciprocal ambiguities from the yielded indication, a second antenna arrangement substantially as described, said first mentioned and second antenna arrangements having substantially the same radiation centre but being characterized by respective valves of N differing by unity, whereby the ambiguity in the bearing indications yielded by the separate systems is resolvable by selecting the one bearing which is common to the indications yielded by each of said two systems.

6. A first N-fold Adcock-type radio direction finding system, where N is an integer greater than unity, said system comprising receiver means having two input circuits, means coupling each input circuit to a respective independently operative array of N Adcock pairs of antennae comprising the antenna system, said pairs comprised in an array being operative in parallel, and indicating means responsive to said receiver means and yielding an indication related to the direction of propagation of radiant energy received by said arrays, each said array being characterized in that the antennae of the said Adcock pairs are located at respective pairs of adjacent corners of a 2 N-sided regular polygon, no two adjacent antennae of the array having the same polarity of coupling, the polygon being so dimensioned that the radiation polar diagram of the array is substantially a cosine function of $N\theta$ where $\theta$ is the azimuth bearing of the radiation, the polygons corresponding to the two arrays having the same centre but being angularly displaced relative to each other by $90°/N$, said receiver means comprising an input goniometer having a search element variably coupled to two spaced quadrature field elements which serve as two input circuits, an omnidirectional sense antenna located at the radiation center of said arrays and means for combining output from said sense antenna with the outputs from said arrays in co-phasal relationship in such a manner as to remove reciprocal ambiguities from the yielded indication, a second antenna system having substantially the same radiation center as said first mentioned antenna system, but being characterized by respective values of N differing by unity, the rotary members of the goniometers of said two systems being coupled to a common operating control means through respective gear means such that a 360° rotation of said operating control means rotates each said goniometer rotary member through a number of complete revolutions equal to the integer N which is characteristic of that one of the said two systems in which the goniometer is comprised, whereby the angular setting of said operating control means corresponding to minimum combined output from both receivers of said two systems is ambiguously indicative of the direction of propagation of the received energy.

7. A direction finding system according to claim 4, in which the receiver means comprises two space quadrature field elements coupled to respective of said arrays and serving as input circuits, and a search element variably coupled to said field elements.

RICHARD FRANCIS CLEAVER.

REFERENCES CITED

The following references are of record in the file of this patent:

UNITED STATES PATENTS

| Number | Name | Date |
|---|---|---|
| 2,238,269 | Koschmieder | Apr. 15, 1941 |
| 2,266,454 | Wagstaffe | Dec. 16, 1941 |
| 2,266,918 | Sullinger et al. | Dec. 23, 1941 |
| 2,444,425 | Busignies | July 6, 1948 |